Figure 4:
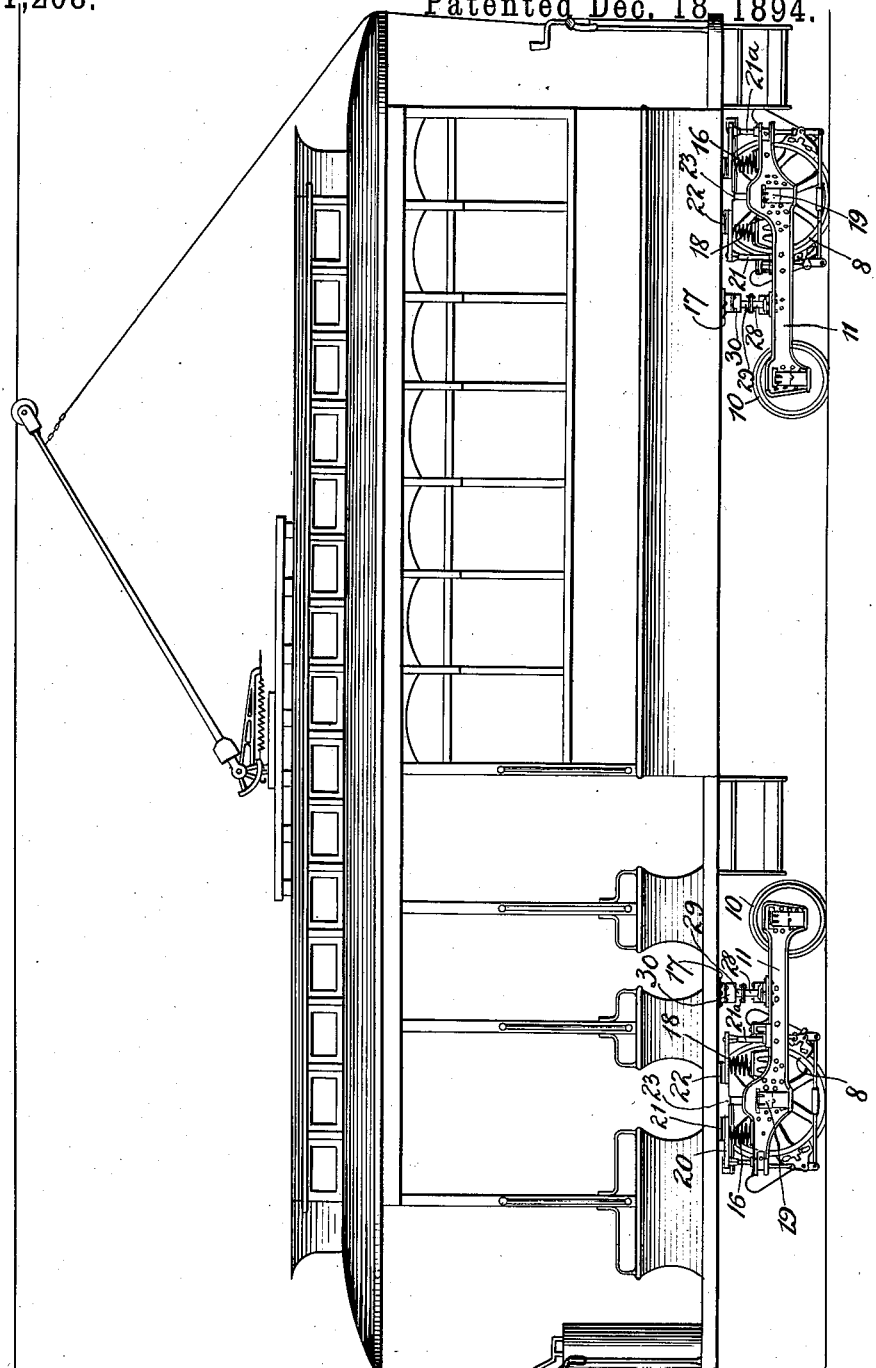

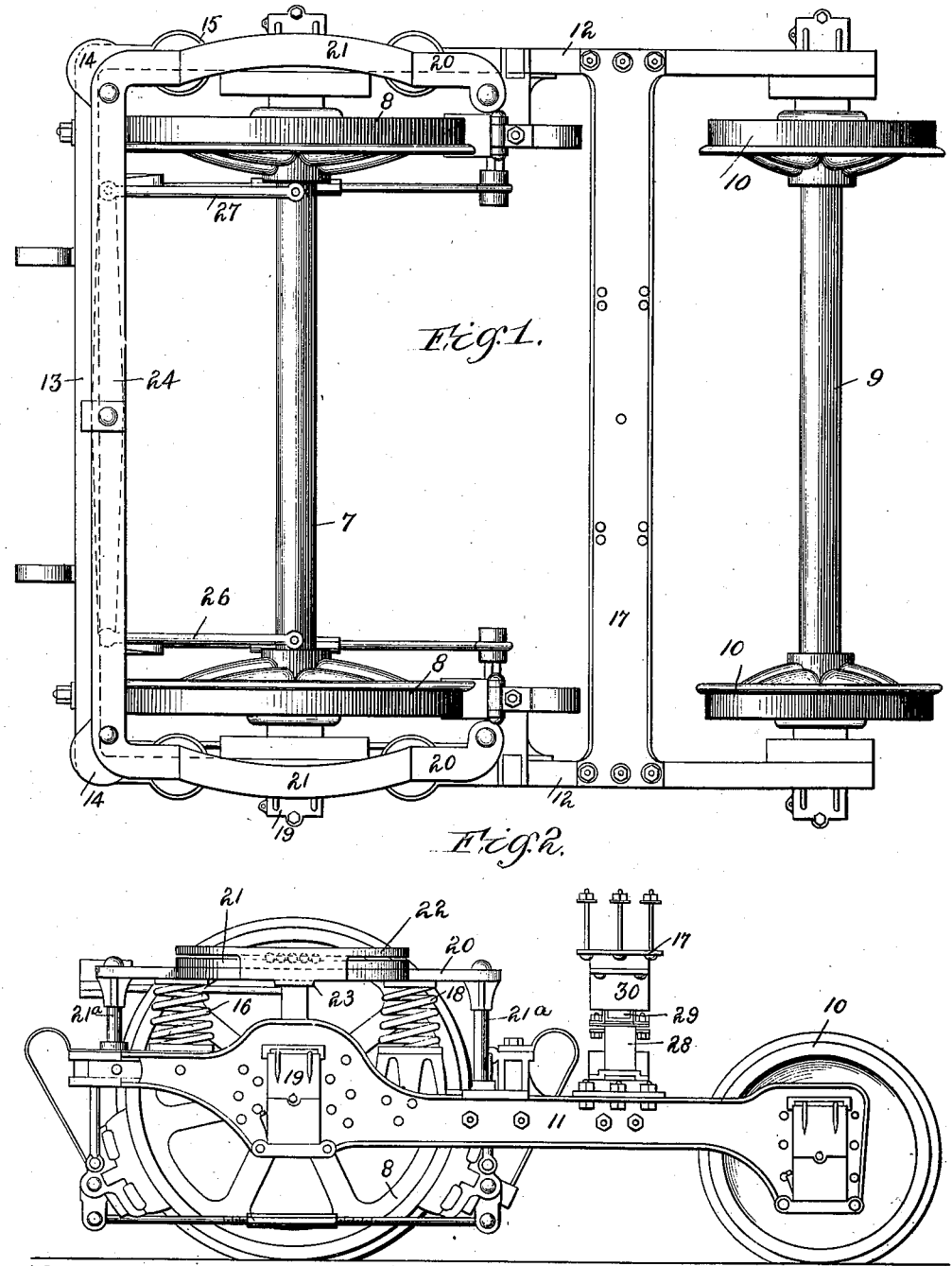

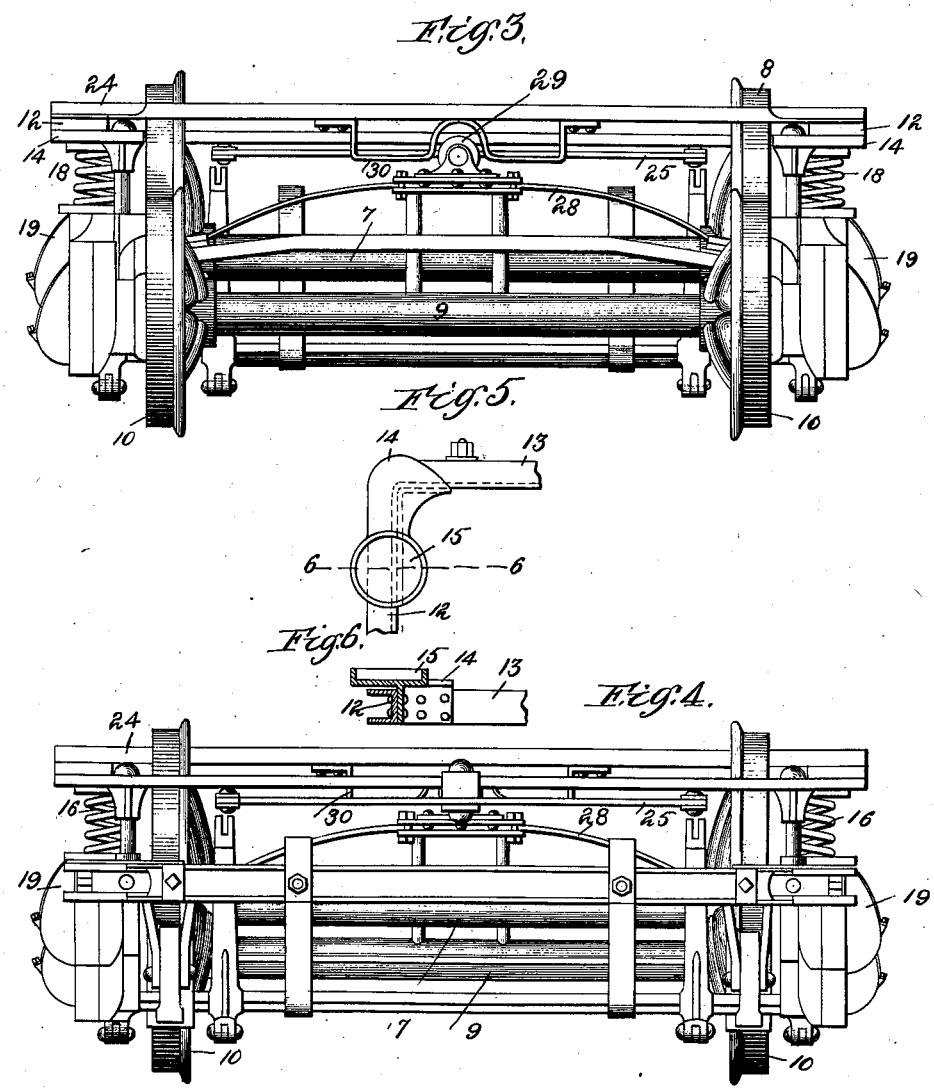

(No Model.) 3 Sheets—Sheet 3.
W. A. McGUIRE & M. G. HUBBARD, Jr.
RAILWAY TRUCK.

No. 531,208. Patented Dec. 18, 1894.

Witnesses

Inventors
William A. McGuire
Moses G. Hubbard Jr.
By Bond, Adams, Pickard & Jackson Attys.

UNITED STATES PATENT OFFICE.

WILLIAM A. McGUIRE AND MOSES G. HUBBARD, JR., OF CHICAGO, ILLINOIS.

RAILWAY-TRUCK.

SPECIFICATION forming part of Letters Patent No. 531,208, dated December 18, 1894.

Application filed May 27, 1893. Serial No. 475,744. (No model.)

*To all whom it may concern:*

Be it known that we, WILLIAM A. MCGUIRE and MOSES G. HUBBARD, Jr., residing at Chicago, in the county of Cook and State of Illinois, citizens of the United States, have invented certain new and useful Improvements in Railway-Trucks, of which the following is a specification, reference being had to the accompanying drawings, in which—

Figure 1 is a top or plan view of our improved truck. Fig. 2 is a side elevation. Fig. 3 is an end view of one end of the truck. Fig. 4 is an end view of the other end of the truck. Fig. 5 is a detail, being a plan view of one of the corner pieces. Fig. 6 is a section on line 6—6 of Fig. 5. Fig. 7 represents, in side elevation, two of the trucks arranged beneath a car.

Our invention relates to railway trucks, and consists of improved means for supporting and distributing the weight of the car body and load.

It further consists of improved means of attaching or swiveling the truck to the car body.

It further consists of a car truck arranged to carry all or any part of the weight of the car body and load on the driving wheels when on a straight track, and to carry any desired portion of said weight on the idle or guide wheels when on curves.

It further consists of an improved truck frame; all of which will be more fully described hereinafter.

That which we regard as new will be set forth in the claims.

In cars using the traction or adhesion of the wheels of the car on the rails as a means of propulsion, it has been found absolutely necessary to support the entire car body and load on the driving wheels of the car in order to get sufficient traction to drive the car rapidly up grades, and to make quick starts when the rails are slippery from any cause, as they often are, particularly in street service. For this reason, in motor cars for street roads, a single truck or four wheeled car has heretofore been the most successful in this service. However, where the travel is heavy, railway companies have been obliged to use double truck cars, and have been and are greatly troubled from a lack of traction on this style of car. To overcome this, what is known as a maximum traction truck has been designed by others, and by us also; but as trucks of this style will not work satisfactorily with more than seventy five per cent. of the weight on the driving wheels, they only partially solve the problem. There have also been several styles of radial trucks designed to solve this problem, but none of them carried all the weight on the driving wheels and yet curved satisfactorily. Another objection to double truck cars has been the height it was necessary to carry the car body from the rail in order to permit the wheels to radiate under the car sills. To overcome these objections we have produced a four wheeled truck, one pair of wheels being driving wheels, and the other idle wheels, as is illustrated in Fig. 1 of the accompanying drawings, in which—

7 indicates the axle of the drive wheels 8, and 9 indicates the axle of the idle wheels 10. As shown in Figs. 1 and 2, the axles 7 and 9 are journaled in bearings in side pieces 11—12 of the truck frame. As shown, the drive wheels 8 are large, and the idle wheels quite small. The truck is pivoted to the car body practically over the center of the axle of the drive wheels, by which construction the large drive wheels may extend up inside the frame of the car body without interfering with any part of the car frame when curving. The idle or guide wheels can be made small enough to pass under the side steps of open or summer cars if necessary, which construction permits the car to be carried as low as in a four wheeled or single truck car.

The above described construction requires a strong, flexible truck frame, and we obtain this by forming the frame of one piece of metal, as shown in Fig. 1, the side pieces 11—12 being formed of one piece with an end piece 13, which is bent into a rectangular frame. This is the construction which we prefer, but if desired the sides and ends may be formed separately and then welded together.

When welded, the welding is best done by electricity, both for convenience and the quality of the work.

To give great diagonal stiffness to the frame, corner braces or reinforcing pieces 14 are provided, which are bolted to the frame at the corners, as shown in Figs. 5 and 6. We prefer to provide the corner pieces 14 with seats 15 to receive the car springs 16, as shown in Fig. 2. In order to make the truck as short as possible we terminate the truck frame at the journal boxes of the idle axle, as shown in Figs. 1 and 2.

17 indicates a cross sill, which is secured to the side pieces 11—12 and extends across the truck frame as close to the idle or guiding wheels 10 as practicable, which cross sill can be used as a motor support when electric motors are used, and is also used to support the device for shifting or distributing the weight of the car body. If desired, an end sill outside the idle or guide wheels, or above them, may be used for this purpose; but we have found the inside sill above described to be the most satisfactoy in practical operation. As the driving axle carries the entire load, it and its journals and journal boxes are made heavier than those of the guide wheels.

The car body is carried upon springs 16—18, which springs are carried, one or more on each side of the journal box 19 of the driving axle. This arrangement secures the best results, since it is easy by this construction to mount the car directly on the driving axle, and, by means of a short upper frame 20, to pivot the truck to the car body. This upper frame 20 is substantially rectangular in shape, as shown in Fig. 1, and is mounted directly upon the springs 16—18 at each side of the truck frame. It is connected to the side bars 11—12 of the truck frame by posts or pedestals 21ª, as best shown in Figs. 2 and 4, which are arranged to permit the upper frame to move up and down by the action of the springs, but maintain their normal relative position between the upper frame and the truck frame.

Upon the top frame 20, practically over the journal boxes 19 at each side of the truck frame, is located a curved side bearing 21, as shown in Fig. 2; and directly over these side bearings are placed roller bearings 22, which are secured to the car body, and are arranged to support the weight of the car body and load, and roll upon the side bearings 21. To take the side thrust of the car body on the truck when passing around curves, the frames of the upper roller bearings 22 are extended down outside of the lower side bearings 21, and turn under the lower side bearings, forming hooks or gibs 23, which extend a short distance under the lower side bearings 21, and serve to prevent the car body from jumping off the truck in case of accident.

If desired, rollers may be placed in these gibs 23 to bear against the edges of the lower side bearings 21, to take the side thrust on curves.

To the center of the end sill 24 of the top frame 20 is pivoted an equalizing lever 25, to each end of which is attached a draft link 26—27, the free ends of which are adapted to be attached to the car body over the center of the driving axle 7. Through the equalizing lever and links the car is drawn, and their construction is such as to permit the truck to swivel or turn on the side roller bearings without any appreciable resistance from the action of the draft.

We do not wish to limit ourselves to the use of roller side bearings, since other forms of side bearings may be used, but the construction shown is preferable.

It will be seen that by the above described construction the truck is pivoted to the car, and the entire weight of the car body and load is mounted directly upon the driving axle. In order to make the truck curve satisfactorily we provide mechanism for shifting a part of the weight to the guiding wheels when the truck is passing around a curve; because, by so shifting the weight to the guiding wheels, the danger of jumping the track at curves is obviated.

To shift the weight to the guiding wheels when rounding curves one or more springs 28 are provided, which are mounted directly upon the cross sill 17, as best shown in Fig. 3, or between the frame and axle boxes of the guide wheels 10. Flat or part elliptic springs are preferred. Mounted centrally upon the spring 28 is a roller 29, also best shown in Fig. 3.

30 indicates a double cam, which is rigidly secured to the under side of the car body directly over the roller 29. Sufficient space is left between the roller and the cam so that when on a straight track the car body can move up and down or the trucks can rock under the car body, without affecting the roller and springs; but as soon as the car strikes a curve, and the truck turns under the car body, the roller 29 will strike the cam, thereby depressing the spring 28 at a given degree of deflection and exerting a downward pressure upon the truck frame, thereby pressing the guide wheels down on the rail with a force equal to the capacity of the spring 28. The capacity of the spring or springs 28 can be so proportioned to the capacity of the springs 16—18 on which the car is mounted, that the desired proportion of weight is distributed between the two axles and the cams can be so proportioned that the pressure on the guiding wheels on curves will increase practically in proportion as the radii of the curves are shortened, or the proportion of pressure will be inversely as the radius of the curve. We have found this construction to work admirably in actual service, and it is the best way now known to us of attaining this object of our invention.

This form of truck gives the entire traction of the car for propulsion on a straight track where it is necessary, and on curves, where the impinging of the flanges of the wheels on the rails gives greater tractive power to the wheels, rendering the entire weight on the driving wheels unnecessary. Part of the weight is shifted on to the guide wheels, holding them down upon the curve rails, and enabling them to guide the trucks around the curves and out on to the straight track again, where the entire load will pass back upon the driving wheels.

We do not wish to limit ourselves to the specific devices shown for shifting a part of the weight from the driving to the guide wheels, as many other devices could be used.

It is obvious that by slight changes in the cam the shifting of the weight may be regulated as desired.

That which we claim as our invention, and desire to secure by Letters Patent, is—

1. A car-truck having means for varying the proportion of weight or load on the car axles by the action of curving, substantially as described.

2. A car truck having means for varying the proportion of weight or load on the car axles by the action of curving at an inverse ratio to the radius of the curve, whereby the trucks are prevented from being derailed in passing around curves, substantially as described.

3. A car truck having a pair of driving wheels and idle or guide wheels, and in which the driving wheels carry the greater part of the entire car body and load on a straight track and provided with means for throwing a portion of such weight on the guiding wheels in passing around curves, substantially as specified.

4. A car-truck having driving wheels and guide wheels and provided with cam-actuated pressure mechanism arranged above the forward portion of the truck, said cam actuated mechanism being adapted to operate to press the guide-wheels upon the rails with an increased force by the action of curving, whereby derailment on curves is prevented, substantially as described.

5. A car-truck having driving wheels and guide wheels and provided with a cam-controlled spring bearing on the forward portion of the truck and adapted to press the guide wheels upon the rails with an increased and yielding or elastic pressure while passing around curves, and cam mechanism which actuates said spring, whereby derailment on curves is prevented and easy riding is attained, substantially as described.

6. The combination with a pivotal car-truck provided with guide wheels and drive wheels and having its pivotal center located directly over the driving axle, of mechanism which increases the pressure of the guide wheels upon the rails when passing around curves, substantially as and for the purpose described.

7. An independent car-truck adapted to swivel under a car body, said truck being constructed with driving wheels and idle or guiding wheels, and having a center upon which it swivels, located practically over the said driving axle, and having mechanism controlled by the movement of the truck in curving, which increases the pressure on the guiding wheels while passing around curves, substantially as set forth.

8. An independent car-truck having driving wheels and guide wheels and adapted to swivel under a car body, practically all the weight of the car and load being carried by the drive wheels on a straight track and mechanism which shifts part of the weight from the driving wheels onto the guide wheels on curves, substantially as and for the purpose described.

9. An independent four wheeled truck adapted to be swiveled under a car body and provided with cam actuated pressure mechanism which acts to vary the proportion of weight on the truck axles by the action of the truck movement under the car body in passing around curves, substantially as and for the purpose set forth.

10. The combination of a car body, a plurality of trucks swiveled under said car body, said trucks being provided with driving wheels and guide wheels, the said driving wheels being arranged to carry the greater part of the weight of the car and load on a straight track, and mechanism which acts to increase the load on the guide wheels while passing around curves, substantially as and for the purpose set forth.

11. The combination of a pivotal car truck having small guide wheels and large drive wheels, the pivotal center of the truck being located practically over the driving axle, with mechanism which acts to increase the pressure of the guide wheels upon the rails when passing around curves, substantially as and for the purposes described.

12. A pivotal car truck having springs for supporting the car body and load located on each side of the driving axle, in combination with an elastically supported roller and an actuating cam, whereby the guiding or idle wheels have an increased elastic downward pressure applied to them in passing around curves, substantially as and for the purpose specified.

13. The combination of a car truck adapted to be pivoted to a car body, and having driving and guiding wheels, with a roller and cam arranged to be brought into contact by the movement of the truck in curving, and an interposed spring whereby the guiding wheels of the truck are pressed upon the rails in curving with an increased elastic force, substantially as described.

14. The combination of a car truck adapted to be swiveled to the car body and having small guide wheels and large driving wheels, and cam actuated devices for shifting a portion of the weight of the car body to said guide wheels when rounding a curve, substantially as described.

15. The combination with a car truck adapted to be swiveled to the car body and having large drive wheels arranged to support the entire weight of the car body, of small guide wheels, and cam actuated spring mechanism for shifting a portion of the weight to said guide wheels when rounding a curve, substantially as described.

WILLIAM A. McGUIRE.
MOSES G. HUBBARD, JR.

Witnesses:
JOHN L. JACKSON,
ALBERT H. ADAMS.